Jan. 1, 1929.
R. B. FAGEOL
TUBULAR BAR BUMPER
Filed May 31, 1927
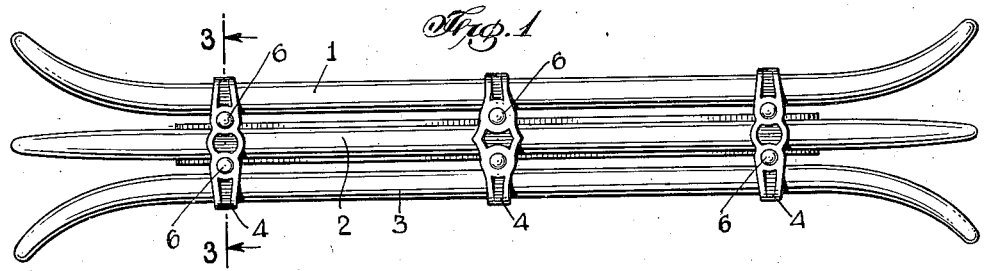
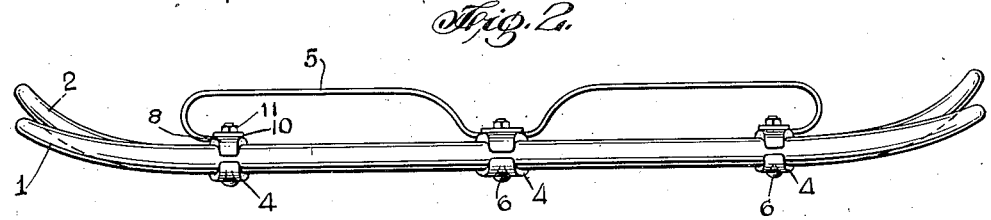
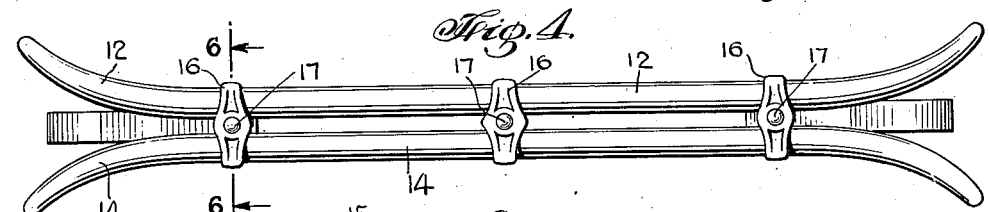
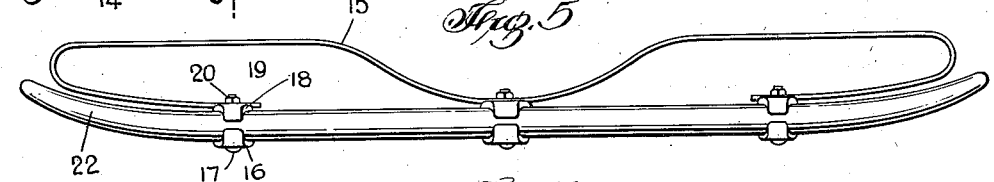
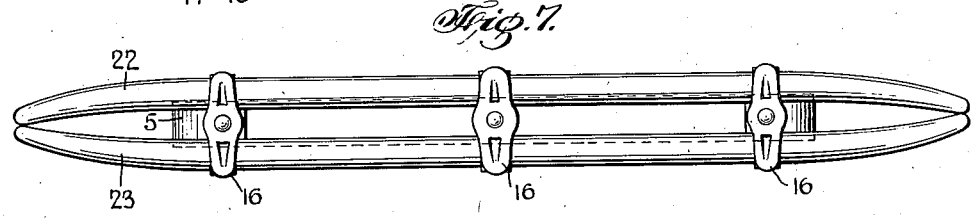
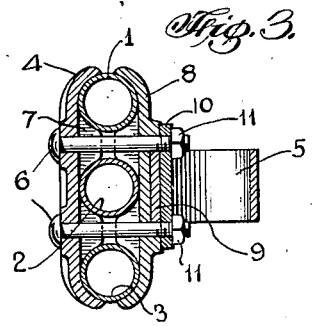
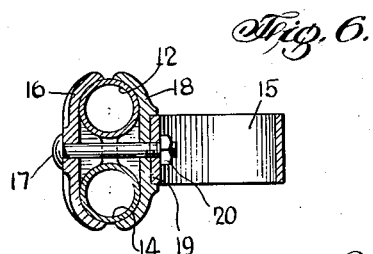
INVENTOR
Rollie B. Fageol
BY
ATTORNEY Patented Jan. 1, 1929.

1,697,498

UNITED STATES PATENT OFFICE.

ROLLIE B. FAGEOL, OF LOS ANGELES, CALIFORNIA, ASSIGNOR TO AMERICAN CHAIN COMPANY, INC., A CORPORATION OF NEW YORK.

TUBULAR-BAR BUMPER.

Application filed May 31, 1927. Serial No. 195,158.

This invention relates to automobile bumpers and more particularly to a type of bumper using bars with curved tips thereon to form an impact section.

It is the principal object of this invention to provide a bumper using a plurality of interchangeable tubular bars as an impact section, said bars having their ends curved and being capable of being positioned in such a manner as to form a bumper with diverging or converging impact areas at its ends.

Another object is to provide a clamping means for holding the tubular bars in vertical alignment.

A clear conception of the construction and further objects of the invention may be had from the following specification in conjunction with the accompanying drawings in which, Fig. 1 discloses the preferred form of the invention in front elevation.

Fig. 2 is a plan view of Fig. 1.

Fig. 3 is a cross section through 3—3 of Fig. 1.

Fig. 4 is a modified form of the invention in front elevation.

Fig. 5 is a plan view of Fig. 4.

Fig. 6 is a cross section through 6—6 of Fig. 4; and

Fig. 7 discloses a further modified form in front elevation.

The now preferred form of the invention as shown in Fig. 1 comprises three bars 1, 2, and 3 of tubular steel having their ends formed in a curved horn shape. These bars are all of the same length and have the same degree of curvature at their ends. The bars 1, 2, and 3 are held in vertical alignment and secured to a rear bar 5 by clamps 4 which are shown in cross section in Fig. 3.

The rear or attaching bar 5 has loop ends thereon and the center portion is brought forward as shown, the loop ends and center portion being secured to the impact section by clamps such as 4. To simplify the description the clamp and front plate are designated by the same numeral. The clamp consists of a front plate 4 having a device or design on its face as shown, with holes for accommodating bolts 6. The center portion 7 of the front plate is hollow with the edges of the plate formed with semi-circular recesses to accommodate the tubes 1, 2 and 3. The rear plate 8 is similar to plate 4 with the exception that it has a recess 9 formed in the center of its rear face for accommodating the rear bar 5 as shown in Fig. 3. The plate 10 with holes therein for accommodating bolts 6 is adapted to be positioned against the rear bar 5 when it is in the recess 9 and the whole clamp is secured about the bars by means of the bolts 6 and nuts 11.

The bars 1 and 3 are positioned as shown with their ends turned to form a bumper with wide or divergent impact areas at its end.

A modified form of the invention as shown in Fig. 4 comprises an impact section of two tubular bars 12 and 14 to which the rear bar 15 is attached by clamps 16. The rear bar is similar to that described above with the exception that the loop ends are extended laterally to form a secondary impact portion positioned between the bars 12 and 14. The bar 15 is wider than the space between the bars 12 and 14. The clamp comprises a front plate 16 formed as shown with its center portion hollowed out as described above and the edges of the plate adapted to grip the bars 12 and 14. The front plate is provided with a hole for accommodating a bolt 17. The rear plate 18 is formed similar to that described above for clamp 4 having a recess 19 therein for accommodating the rear bar 15. The rear plate 18 and the bar 15 are provided with holes for accommodating the bolt 17 and the whole clamp is secured about the bars 12, 14, and 15 by means of the bolt 17 and nut 20.

This type of bumper has its bars 12 and 14 positioned as shown to form a wide impact area at its ends with a rear bar 15 interposed to form a secondary impact section at the ends of the bumper.

A further modification of the invention is shown in Fig. 7 in which a rear bar 5 is combined with a pair of tubular bars 22 and 23 which are secured in vertical alignment by a clamp 16. As is seen from the drawings the bars 22 and 23 are positioned with their tips turned toward each other thereby forming a multi-bar bumper with a curved and tapered end, thereby giving a converging or narrowed impact area at its ends.

The above types of bumpers are assembled loosely in their respective clamps, and as the bars are all of the same length and their tips of the same degree of curvature they are interchangeable. The bars are adapted to be turned until any of the desired forms of end sections as shown in Figs. 1, 4, and 7 are attained. The clamps are then tightened to hold the bars securely in place and the bumper is ready for installation on a vehicle. Due to the fact that the bars are all of the same length and their tips are of the same curvature the bars are easily nested for shipment.

It is apparent that the bars of this type of bumper may be assembled with their tip ends parallel without departing from the scope of this invention.

I claim:

1. In a bumper of the class described, a plurality of bars forming an impact section, certain of said bars having their tips curved and having free ends and means to hold said bars in adjusted relation to form a bumper with an impact section having ends of predetermined width.

2. In a bumper of the class described, a plurality of bars forming an impact section, said bars having their tips curved, and means to hold said bars in adjusted relation to form a bumper with said impact section having said tips converging to constitute narrow ends or diverging to constitute widened ends at will.

3. In a bumper of the class described, a plurality of tubular bars forming an impact section, said bars having their tips curved, and means to hold said bars in adjusted relation to form a bumper with said impact section having said tips converging to constitute narrow ends or diverging to constitute widened ends at will.

4. In a bumper of the class described, an impact section comprising a plurality of tubular bars having their ends horn shaped, a rear bar having loop ends thereon and its center portion brought forward, said ends and center portion adapted for attachment to said impact section and means for securing said impact section and rear bars together to form a bumper with a diverging impact section at its ends.

5. In a bumper of the class described, an impact section comprising a plurality of tubular bars having their ends horn shaped, a rear bar having loop ends thereon and its center portion brought forward, said ends and center portion adapted for attachment to said impact section and means for securing said impact section and rear bars together to form a bumper with a converging impact section at its ends.

6. In a bumper of the class described, an impact section comprising a plurality of tubular bars having their ends horn shaped, a rear bar having loop ends thereon and its center portion brought forward, said ends and center portion adapted for attachment to said impact section, a clamp comprising a front plate and a rear plate, said plates having their center portions hollow and having semi-circular recesses cut in the edges thereof for accommodating said bars therebetween, holes therein for permitting said plates being bolted about said bars and a recess in said rear plate for accommodating said rear bar.

7. In a bumper of the class described, an impact section comprising a plurality of tubular bars having their ends horn shaped, a rear bar having loop ends thereon and its center portion brought forward, said ends and center portion adapted for attachment to said impact section, a clamp comprising a front plate and a rear plate, said plates having their center portions hollow and having semi-circular recesses cut in the edges thereof for accommodating said bars therebetween, holes therein for permitting said plates being bolted about said bars and a recess in said rear plate for accommodating said rear bar, and a third plate for securely gripping said rear bar in said recess by means of said bolts.

8. In a bumper of the class described, an impact section comprising three longitudinally extending tubular bars, said bars having their ends tapered and curved, a rear bar having loop ends thereon and its center portion brought forward, said ends and center portion adapted to be clamped to said impact section by a plurality of clamps, each of said clamps comprising a front plate and a rear plate, said plates having their center portion hollow and having semi-circular recesses cut in horizontal alignment in the edges thereof for clamping said bars in vertical alignment therebetween, holes in each of said plates for accommodating bolts passed between said bars, a recess cut in the rear face of said rear plate for accommodating said rear bar and a flat plate with holes therein for accommodating said bolts, said plate being positioned over said recess, said bolts and flat plate clamping said rear bar and said tubular impact bars in rigid vertical alignment, thereby forming a bumper having a diverging impact section at its end.

9. In a bumper of the class described, an impact section comprising a pair of longitudinally extending tubular bars, said bars having their ends tapered and curved, a rear bar having loop ends thereon and its center portion brought forward, said ends and center portion adapted to be clamped to said impact section by a plurality of clamps, each of said clamps comprising a front plate and a rear plate, said plates having their center portion hollow and having semi-circular recesses cut in horizontal alignment in the edges thereof for clamping said bars in vertical alignment therebetween, a hole in each of said plates for accommodating a bolt passed between said bars, a recess cut in the rear face of said rear plate for accommodating said rear bar, a hole in said rear bar at each point of contact for accommodating said bolts, said bolts thereby clamping said rear bar and said tubular impact bars in rigid vertical alignment, thereby forming a bumper having a diverging impact section at its ends and the loop ends of said rear bar being extended laterally to form an auxiliary impact section between said diverging bars.

10. In a bumper of the class described, an impact section comprising a pair of longitudinally extending tubular bars, said bars having their ends tapered and curved, a rear bar having loop ends thereon and its center portion brought forward, said ends and center portion adapted to be clamped to said impact section by a plurality of clamps, each of said clamps comprising a front plate and a rear plate, said plates having their center portion hollow and having semi-circular recesses cut in horizontal alignment in the edges thereof for clamping said bars in vertical alignment therebetween, a hole in each of said plates for accommodating a bolt passed between said bars, a recess cut in the rear face of said rear plate for accommodating said rear bar, a hole in said rear bar at each point of contact for accommodating said bolts, said bolts thereby clamping said rear bar and said tubular impact bars in rigid vertical alignment, thereby forming a bumper having a converging impact section at its ends.

In testimony whereof, I have signed this specification.

ROLLIE B. FAGEOL.